UNITED STATES PATENT OFFICE.

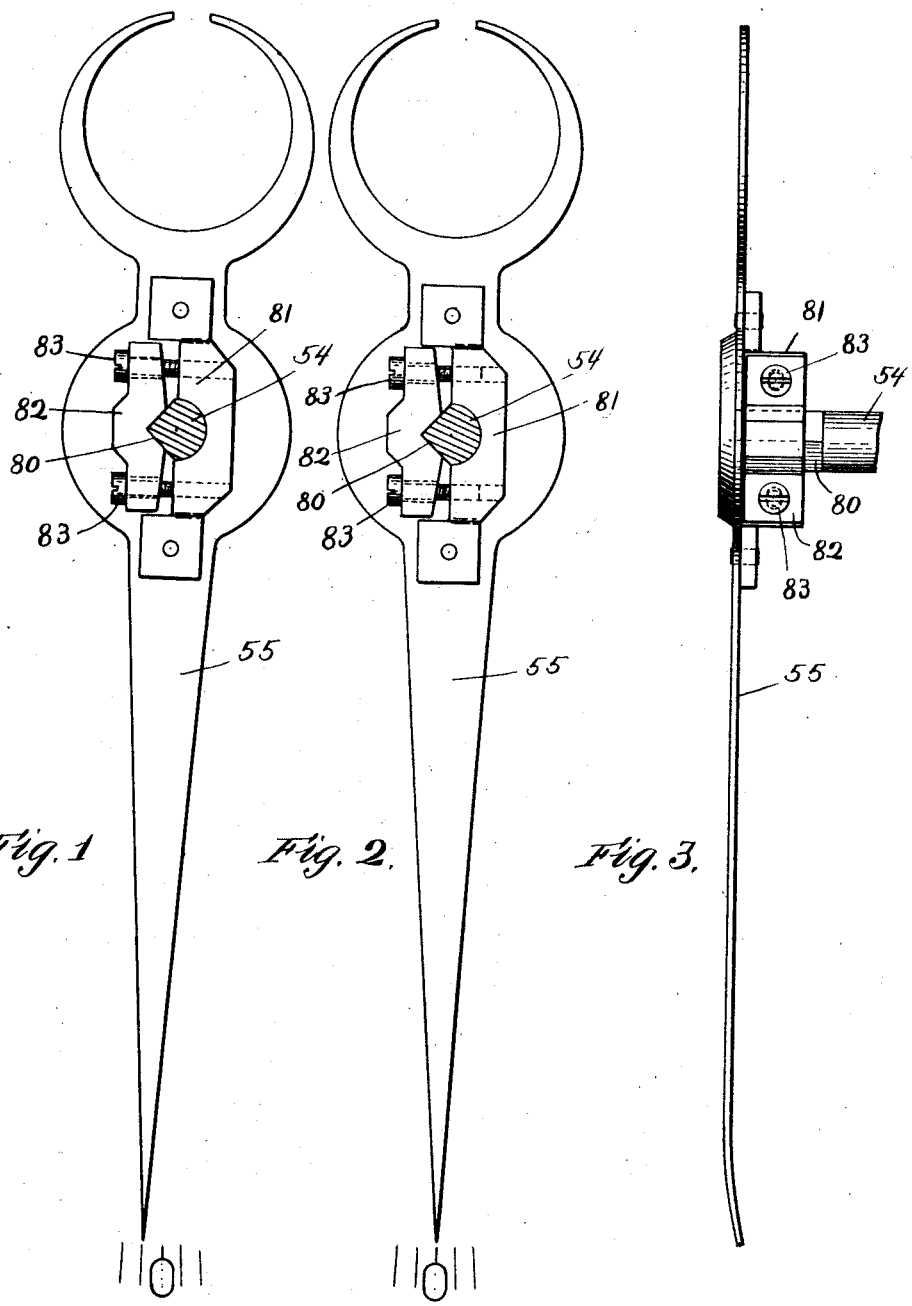

FREDERICK VERPLAST, OF BOSTON, MASSACHUSETTS.

ADJUSTABLE MEANS FOR AFFIXING POINTERS TO SHAFTS.

1,011,285. Specification of Letters Patent. Patented Dec. 12, 1911.

Application filed April 2, 1910. Serial No. 553,095.

*To all whom it may concern:*

Be it known that I, FREDERICK VERPLAST, of Boston, in the county of Suffolk and State of Massachusetts, have invented an Improvement in Adjustable Means for Affixing Pointers to Shafts, of which the following is a specification.

This invention relates to weighing-machines and other devices having pointers or indicating-hands movable over dials.

The invention has for its object the provision of improved means for fixing a pointer to its supporting-shaft in an adjustable manner, whereby a very slight adjustment may be made easily and quickly, to correct any inaccuracy in the position of the pointer with respect to the dial.

Figure 1 is a front elevation of a pointer secured to a shaft by means embodying this invention, the pointer being slightly removed from its true position with respect to the dial. Fig. 2 is a similar view, the adjusting-device having operated to move the pointer with respect to the shaft and dial. Fig. 3 is an edge view of the pointer and adjusting-means.

54 represents the shaft bearing the pointer or indicating-hand 55. The shaft or the end-portion thereof is slabbed off on one side to present a V-shaped portion 80, including about one-half its circumference, leaving the other half of its circumference circular. The end-portion of the shaft is thus provided with two unlike side-portions, one of which is made other than circular, and, so far as my invention is concerned, said shaft may be formed in different ways for the accomplishment of this result.

The pointer has secured to it, adjacent the hole for the shaft, a small plate 81, having a semi-circular recess adapted to receive the circular portion of the shaft, and a small plate 82 is adjustably connected to the plate 81 by two screws 83, 83, extended through the opposite ends of the plate 82, and into or through the corresponding ends of the plate 81. Said plate 82, at a point intermediate its length, has a V-shaped recess which receives the V-shaped portion of the shaft 54, and, when in engagement therewith, is fixedly held in position with respect to the shaft. If the shaft has a side-portion formed other than V-shaped the recess in the plate 82 will be correspondingly shaped. The edge or side of the plate 82, adjacent the plate 81, is beveled both above and below the V-shaped recess, or is otherwise cut away, permitting the plate 81 to be drawn toward it, either above or below the shaft, which movement is accomplished by turning up one of the screws, and, if necessary, loosening the other screw to permit of such movement. As the plate 81 is thus moved with respect to the plate 82, which latter is held in fixed position with respect to the shaft, said plate 81 is moved rotarily about the shaft and the pointer is correspondingly moved with respect to the shaft and the dial, and any inaccuracy, however slight, may be corrected. Such adjustment or readjustment may be made by an unskilled person. Furthermore, a pointer thus clamped to the shaft is very securely held thereon, and, when once adjusted, is not liable to become loosened.

I claim:

1. In a weighing-machine, a pointer-shaft having unlike side-portions one of said side-portions being circular, a pointer, a pair of clamping-plates adapted to respectively engage the unilke side-portions of the shaft, and separated to permit movement of one with respect to the other, the plate which engages the circular portion of the shaft being movable rotarily about the shaft when in engagement therewith, and the other plate remaining in fixed position with respect to the shaft, said movable plate being secured to the pointer, and adjusting-screws connecting said plates together at their ends, substantially as described.

2. In a weighing-machine, a pointer-shaft having a circular portion and a V-shaped portion, a pointer, and a pair of widely separated clamping-plates, one of said plates being secured to the pointer and having a semicircular recess to receive the circular portion of the shaft, permitting rotary movement about said shaft, and the other plate having a V-shaped recess to receive the V-shaped portion of the shaft, whereby it is held in fixed position with respect to the shaft and adjustable means for connecting said plates together, substantially as described.

3. In a weighing-machine, a pointer-shaft having a circular portion and a V-shaped portion, a pointer, and a pair of clamping-plates, one of said plates being secured to the pointer and having a semicircular recess to receive the circular portion of the shaft, permitting rotary movement about the shaft, and the other plate having a V-shaped recess to receive the V-shaped portion of the
5 shaft, whereby it is held in fixed position with respect to the shaft, and having its edge above and below said recess inclined in opposite ways, to permit independent rotary movement of the aforesaid plate, and adjustable means for connecting said plates 10 together, substantially as described.

In testimony whereof, I have signed my name to this specification, in the presence of two subscribing witnesses.

FREDERICK VERPLAST.

Witnesses:
B. J. NOYES,
H. B. DAVIS.